United States Patent
Zewail et al.

(10) Patent No.: US 11,540,268 B2
(45) Date of Patent: Dec. 27, 2022

(54) SINGLE TRANSPORT BLOCK OVER MULTIPLE SLOTS WITH DISCONTINUOUS SLIVS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Yan Zhou, San Diego, CA (US); Zhifei Fan, San Diego, CA (US); Wooseok Nam, San Diego, CA (US); Qingjiang Tian, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/172,630

(22) Filed: Feb. 10, 2021

(65) Prior Publication Data

US 2022/0256511 A1 Aug. 11, 2022

(51) Int. Cl.
*H04W 72/04* (2009.01)
*H04W 72/14* (2009.01)
*H04W 72/12* (2009.01)
*H04L 5/00* (2006.01)

(52) U.S. Cl.
CPC ......... *H04W 72/042* (2013.01); *H04L 5/0048* (2013.01); *H04W 72/1289* (2013.01); *H04W 72/14* (2013.01)

(58) Field of Classification Search
CPC ............ H04W 72/14; H04W 72/1289; H04W 72/042; H04L 5/0048
USPC ......................................................... 370/329
See application file for complete search history.

(56) References Cited

U.S. PATENT DOCUMENTS

| | | | |
|---|---|---|---|
| 2019/0149365 A1* | 5/2019 | Chatterjee | H04L 5/0044 370/329 |
| 2020/0221478 A1* | 7/2020 | Fakoorian | H04W 28/06 |
| 2020/0267773 A1* | 8/2020 | Islam | H04W 80/02 |
| 2020/0313793 A1* | 10/2020 | Jung | H04L 5/0044 |
| 2020/0351847 A1* | 11/2020 | Kim | H04W 72/0446 |
| 2020/0389897 A1* | 12/2020 | Mondal | H04L 1/08 |
| 2021/0320760 A1* | 10/2021 | Rastegardoost | H04L 5/0055 |
| 2022/0116953 A1* | 4/2022 | Kim | H04L 1/0003 |
| 2022/0201725 A1* | 6/2022 | Liu | H04W 72/0446 |

* cited by examiner

*Primary Examiner* — Peter G Solinsky
(74) *Attorney, Agent, or Firm* — Procopio, Cory, Hargreaves & Savitch LLP

(57) ABSTRACT

A configuration for a single transport block spanning over multiple slots and having a noncontiguous time domain allocation. The apparatus configures DCI that schedules a plurality of PDSCH symbols or a plurality of PUSCH symbols with a single transport block that spans more than one slot and at least one gap between two adjacent PDSCH symbols or PUSCH symbols. Each of the plurality of PDSCH symbols or PUSCH symbols are contiguous and have a respective SLIV. The apparatus transmits the DCI to at least one UE.

30 Claims, 9 Drawing Sheets

SINGLE TRANSPORT BLOCK OVER MULTIPLE SLOTS WITH DISCONTINUOUS SLIVS

BACKGROUND

Technical Field

The present disclosure relates generally to communication systems, and more particularly, to a configuration for a single transport block spanning over multiple slots with discontinuous start and length indicator values (SLIVs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus configures downlink control information (DCI) that schedules a plurality of physical downlink shared channel (PDSCH) symbols or a plurality of physical uplink shared channel (PUSCH) symbols with a single transport block that spans more than one slot and at least one gap between two adjacent PDSCH symbols or PUSCH symbols. Each of the plurality of PDSCH symbols or PUSCH symbols are contiguous and have a respective start and length indicator value (SLIV). The apparatus transmits the DCI to at least one user equipment (UE).

In an aspect of the disclosure, a method, a computer-readable medium, and an apparatus are provided. The apparatus may be a device at a UE. The device may be a processor and/or a modem at a UE or the UE itself. The apparatus receives, from a base station, downlink control information (DCI) that schedules a plurality of physical downlink shared channel (PDSCH) symbols or a plurality of physical uplink shared channel (PUSCH) symbols with a single transport block that spans more than one slot and at least one gap between two adjacent PDSCH symbols or PUSCH symbols. Each of the plurality of PDSCH symbols or PUSCH symbols are contiguous and have a respective start and length indicator value (SLIV). The apparatus determines a rate matching sequence of the single transport block. The apparatus communicates with the base station based on a corresponding grant of the plurality of PDSCH symbols or PUSCH symbols, wherein communication with the base station is based on a schedule configured by the DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
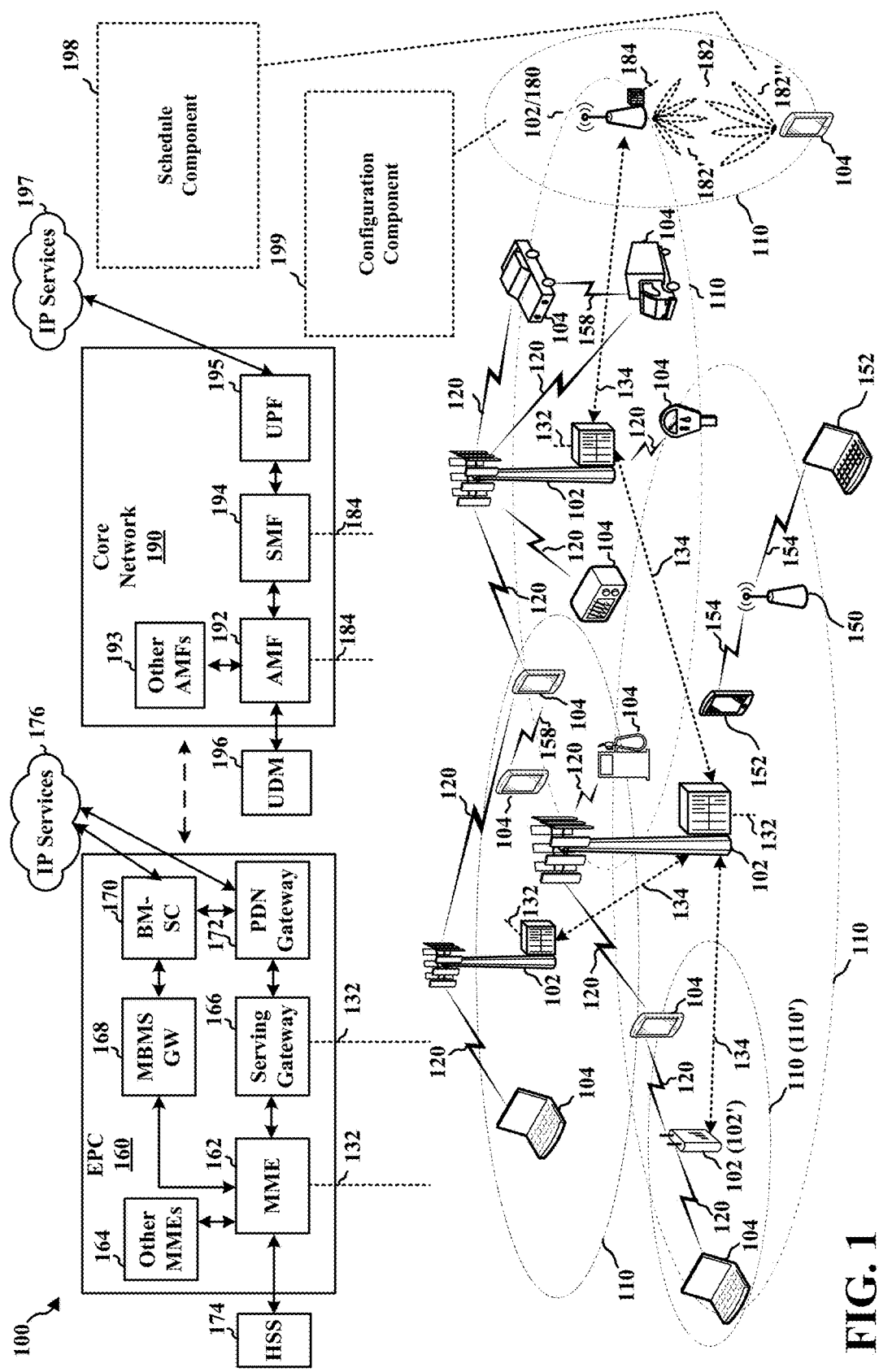
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5 GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a DCI having a single transport block that spans more than one slot and has a noncontiguous time domain allocation, e.g., there is at least one symbol gap between two of the allocated adjacent PDSCH symbols or PUSCH symbols. For example, the UE 104 may comprise a configuration component 198 configured to receive a DCI having a single transport block that spans more than one slot and has a noncontiguous time domain allocation. The UE 104 may determine a rate matching sequence of the single transport block. The UE 104 may communicate with the base station 180 based on a corresponding grant of the plurality of PDSCH symbols or PUSCH symbols. Communication with the base station is based on a schedule configured by the DCI.

Referring again to FIG. 1, in certain aspects, the base station 180 may be configured to configure a DCI having a single transport block that spans more than one slot and has a noncontiguous time domain allocation. For example, the base station 180 may comprise a schedule component 199 configured to configure a DCI having a single transport block that spans more than one slot and has a noncontiguous time domain allocation. The base station 180 may configure DCI that schedules a plurality of PDSCH symbols or PUSCH symbols with a single transport block that spans more than one slot and at least one gap between two adjacent PDSCH symbols or PUSCH symbols, wherein each of the plurality of PDSCH symbols or PUSCH symbols are contiguous and have a respective SLIV. The base station 180 may transmit the DCI to at least one UE 104.

Although the following description may be focused on 5G NR, the concepts described herein may be applicable to other similar areas, such as LTE, LTE-A, CDMA, GSM, and other wireless technologies.

Figure 2:
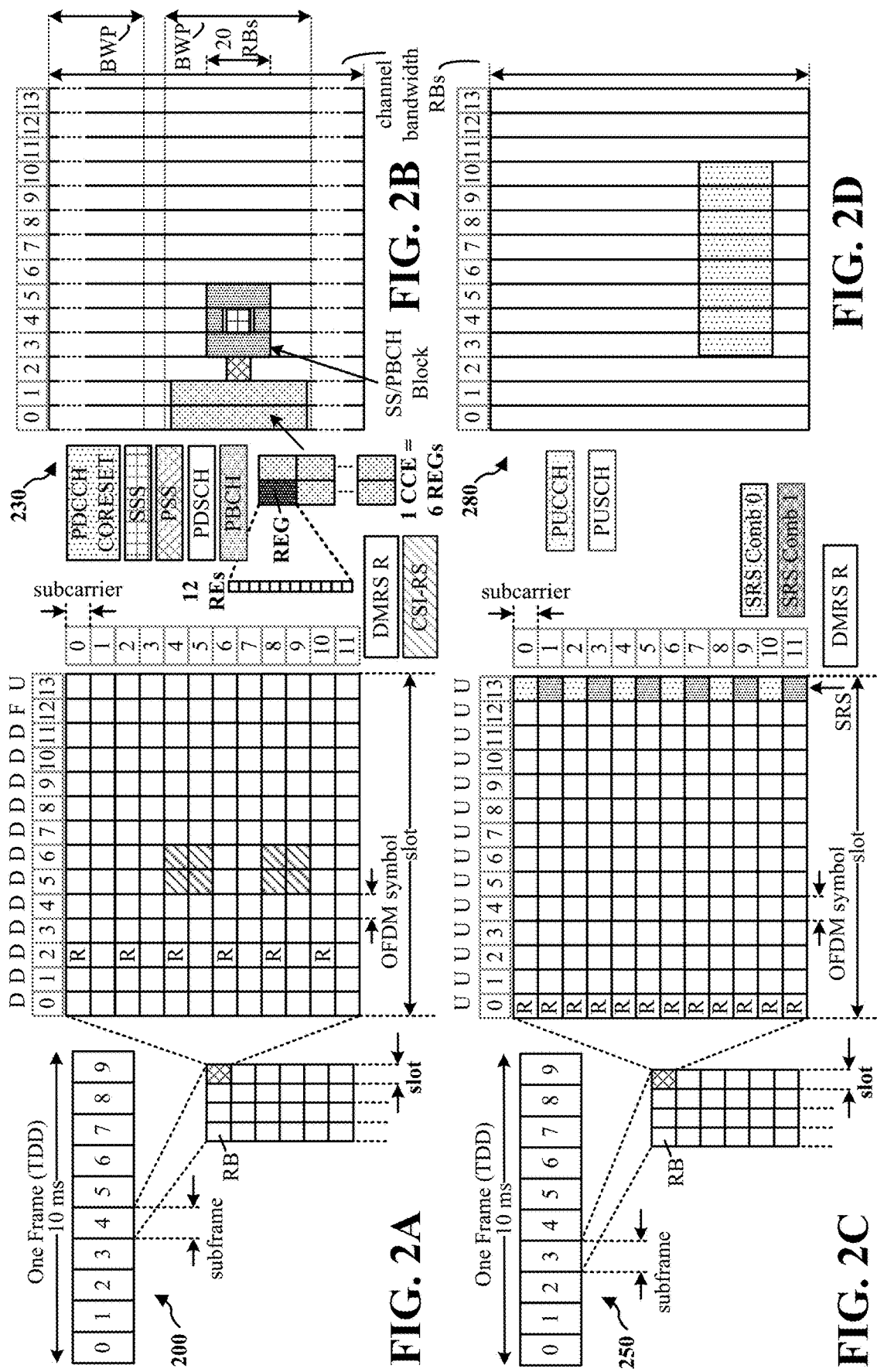
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
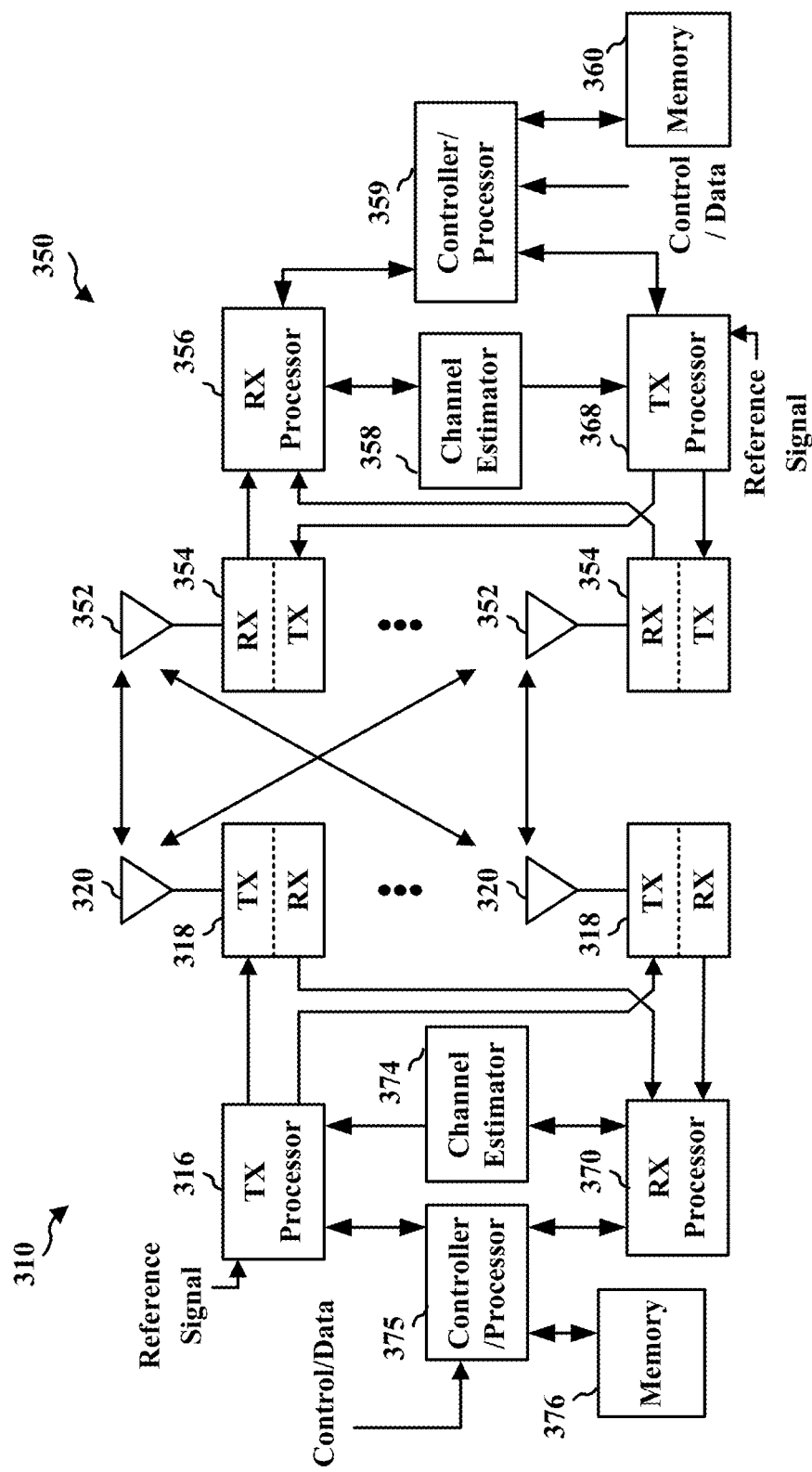
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some wireless communication systems, a multi-PUSCH grant may be utilized in an effort to reduce or control signaling overhead. The multi-PUSCH grant is configured to have data allocations scheduled back to back or in a consecutive manner in the time domain. The multi-PUSCH feature may be implemented for downlink purposes and develop a multi-PDSCH feature in an effort to reduce or control signaling overhead. For example, in millimeter wave (mmW) channels, especially when an increase subcarrier spacing is used, the slots may be much shorter, such that a multi-PDSCH grant may assist in scheduling longer downlink bursts. The high directionality of mmW channels may cause a delay in switching beams between different users, so it would be advantageous to reduce or minimize overhead signaling. In addition, an uplink coverage enhancement scheme may include a single transport block that is configured to span more than one slot which may be utilized in the scheduling of longer uplink bursts. Certain data allocations do not exceed 14 symbols (e.g., one slot). However, the single transport block configured to be mapped to more than one slot and may be utilized to schedule longer uplink bursts. Similarly, a long downlink burst that spans more than one slot may be scheduled to avoid frequent uplink/downlink switching and save some HARQ process IDs. In such instances, it would be advantageous to have gaps within the data allocations.

Aspects provided herein provide a configuration for a DCI to schedule a plurality of PDSCH symbols or PUSCH symbols within a single transport block that spans more than one slot, where the single transport block has at least one gap between two adjacent PDSCH symbols or PUSCH symbols. For example, a base station may configure a DCI that schedules a plurality of PDSCH symbols or PUSCH symbols with a single transport block that spans more than one slot and at least one gap between two adjacent PDSCH symbols or PUSCH symbols. Each of the plurality of PDSCH symbols or PUSCH symbols may be contiguous and have a respective SLIV. For example, the DCI may schedule multiple sets of the plurality of PDSCH symbols or PUSCH symbols where each set is comprised of contiguous PDSCH symbols or PUSCH symbols and has a respective SLIV, such that the multiple sets of the plurality of PDSCH symbol or PUSCH symbols s correspond to a PDSCH or a PUSCH.

Figure 4:
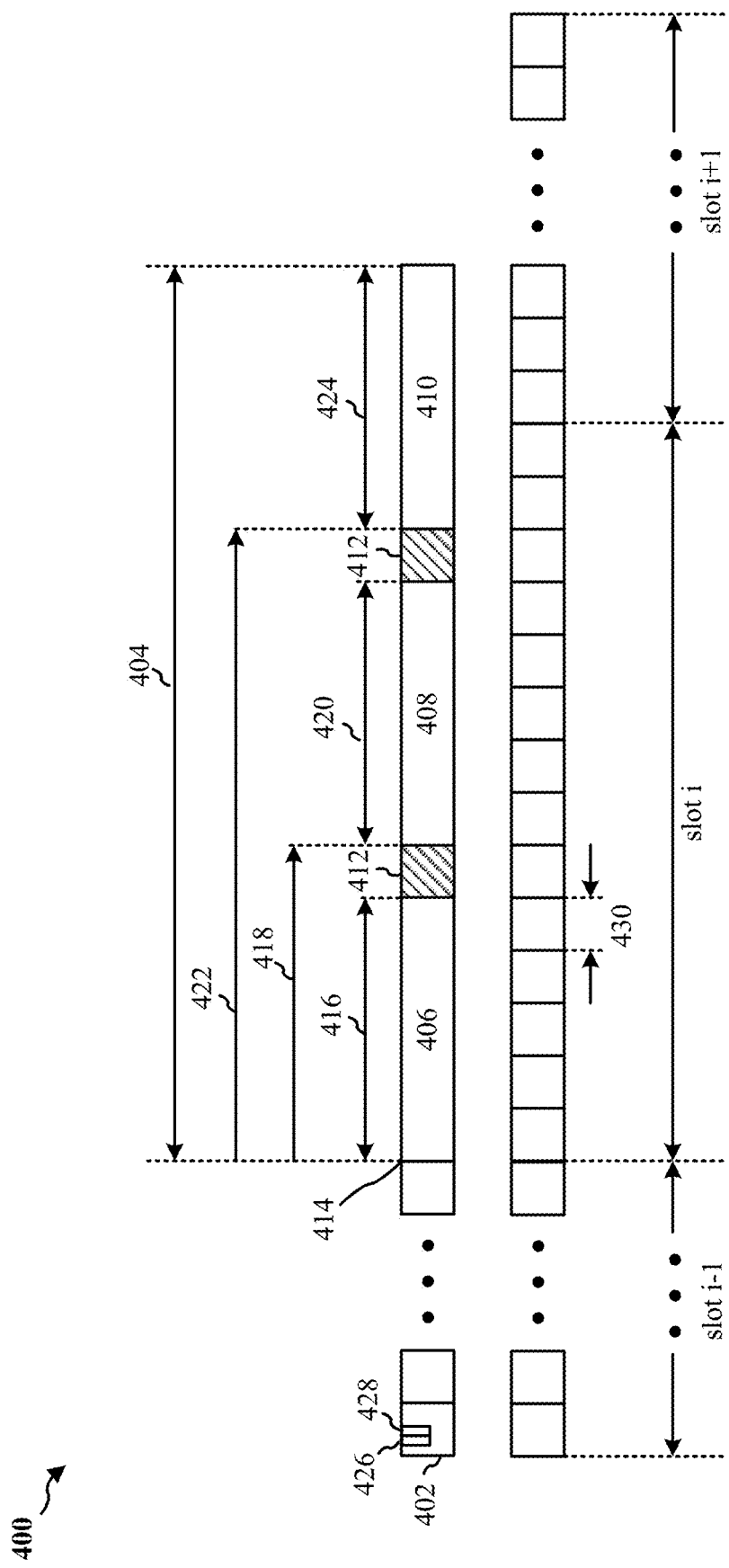
FIG. 4 is a diagram illustrating an example of a transport block spanning over multiple slots in accordance with certain aspects of the disclosure.

FIG. 4 is a diagram illustrating an example 400 of a transport block spanning over multiple slots. A DCI 402 may schedule a plurality of PDSCH symbols or PUSCH symbols (e.g., 406, 408, 410) with a single transport block 404 that spans more than one slot. In the example 400 of FIG. 4, the single transport block 404 is disclosed as spanning over slot i and over part of slot i+1. However, the disclosure is not intended to be limited to the aspects presented herein. For example, in some aspects, the single transport block 404 may be configured to span over a plurality of slots, such that the single transport block spans over multiple slots in their entirety, such that the single transport block ends at an end of the last slot of the multiple slots. In some aspects, the single transport block may span over multiple slots and end within part of the last slot of the multiple slots.

The plurality of PDSCH/PUSCH symbols (e.g., 406, 408, 410) may each be a set of a plurality of contiguous PDSCH/PUSCH symbols. Each of the plurality of PDSCH/PUSCH symbols (e.g., 406, 408, 410) may have a respective SLIV. The time domain resource allocation 426 of the DCI 402 may be configured with the respective SLIV for each of the plurality of PDSCH/PUSCH symbols 406, 408, 410. For example, the first plurality of PDSCH/PUSCH symbols 406 may comprise a first start symbol 414 and a first length 416. The second plurality of PDSCH/PUSCH symbols 408 may comprise a second start symbol 418 and a second length 420. The third plurality of PDSCH/PUSCH symbols 410 may comprise a third start symbol 422 and a third length 424. In the example 400 of FIG. 4, the plurality of PDSCH/PUSCH symbols 406, 408, 410 are shown as having the same length (e.g., 5 symbols). However, in some aspects, each of the plurality of PDSCH/PUSCH symbols 406, 408, 410 may have the same or different lengths. In some aspects, the single transport block 404 may comprise a noncontiguous time domain allocation comprising a gap 412 in between two adjacent PDSCH/PUSCH symbols. For example, the gap 412 may be in between a first set of a plurality of PDSCH/PUSCH symbols 406 and a second set of a plurality of PDSCH/PUSCH symbols 408. In addition, another gap 412 may be in between the second set of a plurality of PDSCH/PUSCH symbols 408 and a third set of a plurality of PDSCH/PUSCH symbols 410. The gaps 412 may be scheduled by the DCI 402. In the example 400 of FIG. 4, the gaps 412 are shown as being comprised of one symbol, similar to that of symbol 430. However, in some aspects, the gaps 412 may comprise more than one symbol. In some aspects, the gaps 412 may comprise the same or different amount of symbols. The gaps 412 may be utilized for uplink or downlink communications between the UE and base station.

The plurality of PDSCH/PUSCH symbols 406, 408, 410 in combination with the respective SLIVs may be configured to correspond with respective PDSCH/PUSCH grants. As such, the corresponding PDSCH/PUSCH may be configured to comprise a corresponding noncontiguous time domain allocation, similarly as the single transport block spanning more than one slot. The DMRS pattern for each set of the plurality of PDSCH/PUSCH symbols 406, 408, 410 may be the same as a single slot PDSCH/PUSCH grant with the same SLIV. However, the discontinuous SLIV of the single transport block that spans more than one slot may cause confusion at the UE side between the single transport block that spans more than one slot and a multi-PDSCH/PUSCH grant where each grant has a respective transport block as the TDRA field in the scheduling DCI will be the same, such that the rate match may fail. As such, in an effort to reduce rate match failure, the base station may provide an indication of the scheduling grant configuration of the DCI. For example, the indication may indicate the type of scheduling grant configuration, e.g., the single transport block that spans more than one slot. The indication may be provided via RRC, MAC-CE, or DCI. In some aspects, the DCI 402 may include the indication of the type of scheduling grant configuration in the indication 428, wherein the indication 428 is an additional bit such that the value of the additional bit indicates the type of scheduling grant configuration of the DCI 402. In some aspects, the MAC-CE may provide instructions to interpret the scheduling grant configuration of the DCI.

In some aspects, a plurality of PUSCH symbols may be configured in a manner similar to the plurality of PDSCH symbols 406, 408, 410. For example, the DMRS pattern for each set of the plurality of PUSCH symbols may be the same as a single slot PUSCH grant with the same SLIV. However, the discontinuous SLIV of the single transport block that spans more than one slot may cause confusion at the UE side between the single transport block that spans more than one slot and a multi-PUSCH grant where each grant has a respective transport block as the TDRA field in the scheduling DCI will be the same, such that the rate match may fail. As such, in an effort to reduce rate match failure, the base station may provide an indication of the scheduling grant configuration of the DCI, similarly as discussed above for the plurality of PDSCH symbols.

In some aspects, in an effort to further reduce or minimize rate match failure, the base station may provide an indication of a calculation of a transport block size of the single transport block. For example, the calculation of the single transport block spanning more than one symbol may be the same or different than a transport block that does not span more than one symbol. As such, in some aspects the calculation of the single transport block spanning more than one symbol may be calculated based on a different manner (e.g., equation or formula) than that of a transport block that does not span more than one symbol. The proper transport block size assists the UE to properly determine the rate matching of the single transport block, and thereby properly decode the plurality of PDSCH/PUSCH symbols. In some aspects, the indication of the calculation of the transport block size may be provided via RRC, MAC-CE, or DCI. In some aspects, the MAC-CE may provide instructions to interpret the set of incoming grants within the single transport block. In some aspects, the DCI 402 may include the indication of the calculation of the transport block size in the indication 428, wherein indication 428 is an additional bit such that the value of the additional bit indicates the transport block size (e.g., capped to a predetermined size or based on the total number of granted symbols and the actual DMRS overhead). For example, the value of the additional bit of the DCI, the instructions of the MAC-CE, or the RRC signal may indicate the transport block size calculation of the single transport block. In some aspects, the indication of the calculation of the transport block size may indicate the manner in which the transport block size may be calculated. For example, the indication of the calculation of the transport block size may indicate a formula to calculate the transport block size. In some aspects, the indication 428 may include the indication of the scheduling grant configuration of the DCI and the indication of the calculation of the transport block size of the single transport block. In some aspects, the indication for the scheduling grant configuration of the DCI may be separate from the indication of the calculation of the transport block size of the single transport block.

Figure 5:
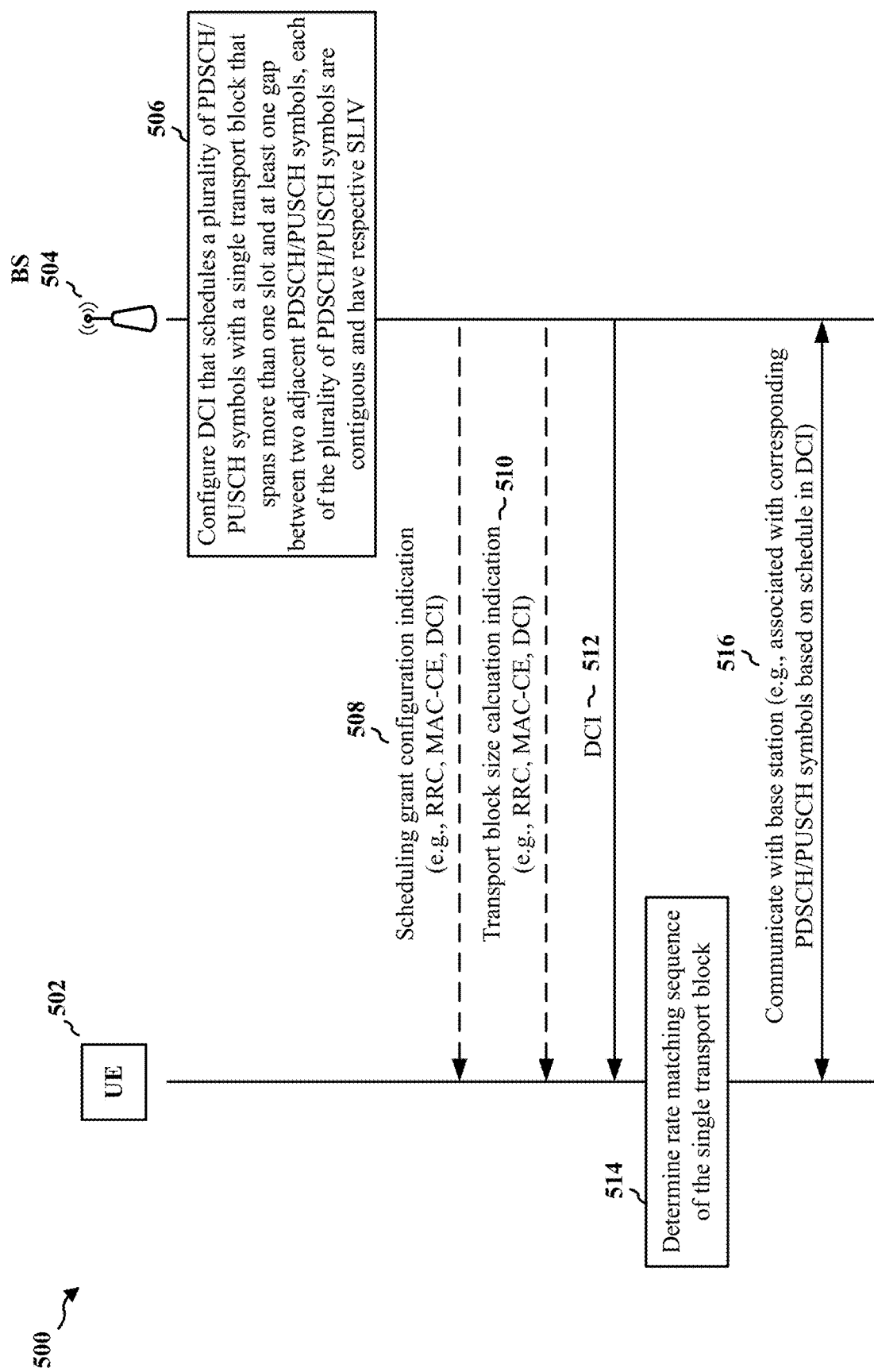
FIG. 5 is a call flow diagram of signaling between a UE and a base station in accordance with certain aspects of the disclosure.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350. Optional aspects are illustrated with a dashed line.

As illustrated at 506, the base station 504 may configure a DCI that schedules a plurality of PDSCH/PUSCH symbols with a single transport block that spans more than one slot.

The single transport block may include a noncontiguous time domain allocation comprising at least one gap between two adjacent PDSCH/PUSCH symbols. Each of the plurality of PDSCH/PUSCH symbols may be contiguous and may have a respective SLIV. In some aspects, the at least one gap may comprise at least one symbol. The DCI may schedule the at least one gap within the single transport block that spans more than one slot. In some aspects, the at least one gap may be utilized for control monitoring, uplink transmission, feedback transmission, or for beam switching purposes if the grants are not sent on the same beams. In some aspects, the at least one gap may be utilized for any other uplink and/or downlink communication between the UE and the base station. In some aspects, time domain resource allocations for the plurality of PDSCH/PUSCH symbols may comprise multiple SLIVs. For example, the multiple SLIVs may identify the start symbol and a length for different sets of contiguous PDSCH/PUSCH symbols, such that the multiple SLIVs correspond to a PDSCH/PUSCH grant. The at least one gap may be between two adjacent SLIVs. In some aspects, the DCI may schedule multiple sets of contiguous PDSCH/PUSCH symbols in time and a gap of at least one symbol between adjacent sets of contiguous PDSCH/PUSCH symbols. For example, the DCI may schedule a first set of contiguous PDSCH/PUSCH symbols, followed by a gap, then a second set of contiguous PDSCH/PUSCH symbols, then another gap, such that the combination of the sets of contiguous PDSCH/PUSCH symbols represent the same PDSCH/PUSCH with the same transport block. In some aspects, a calculation of a size of the single transport block may be based on a total number of granted symbols and a total DMRS overhead. In some aspects, a DMRS pattern may be the same for each of the plurality of PDSCH/PUSCH symbols. For example, the DMRS pattern for each set of contiguous PDSCH/PUSCH symbols may be the same as a single slot PDSCH/PUSCH having the same SLIV.

In some aspects, for example as illustrated at 508, the base station 504 may provide an indication to indicate a scheduling grant configuration of the DCI. The base station 506 may provide the indication of the scheduling grant configuration to the UE 502. The UE 502 may receive the indication of the scheduling grant configuration of the DCI from the base station 504. The plurality of symbols of the single transport block having respective SLIV may cause confusion at the UE side between the single transport block spanning more than one block and having a plurality of PDSCH/PUSCH symbols and a multiple PDSCH/PUSCH grant where a plurality of transport blocks each have a respective set of PDSCH/PUSCH symbols scheduling separate grants. In such instances, the UE may be confused and may not be able to determine the proper rate matching sequence of the transport block. As such, the base station may provide the indication which indicates that the scheduling grant configuration of the DCI comprises a single transport block that spans more than one slot. In some aspects, the indication may be provided via RRC, MAC-CE, or DCI. In some aspects, the MAC-CE may provide instructions to interpret the scheduling grant configuration of the DCI. In some aspects, the DCI may include an additional bit, where the value of the additional bit may indicate a type of the scheduling grant configuration of the DCI. For example, the value of the additional bit of the DCI, the instructions of the MAC-CE, or the RRC signal may indicate that the type of scheduling grant configuration of the DCI comprises a single transport block spanning more than one slot and having gaps in between a plurality of PDSCH/PUSCH symbols.

In some aspects, for example as illustrated at 510, the base station 504 may provide an indication of a calculation of a transport block size of the single transport block. The base station 504 may provide the indication of the calculation of the transport block size of the single transport block to the UE 502. For example, the indication of the calculation of the transport block size of the single transport block may indicate that the transport block size is capped to a predetermined size or the transport block size may be based on the total number of granted PDSCH/PUSCH symbols and the actual DMRS overhead. In some aspects, the indication of the calculation of the transport block size may be provided via RRC, MAC-CE, or DCI. In some aspects, the MAC-CE may provide instructions to interpret the set of incoming grants within the single transport block. In some aspects, the DCI may include an additional bit, where the value of the additional bit may indicate the transport block size (e.g., capped to a predetermined size or based on the total number of granted symbols and the actual DMRS overhead). For example, the value of the additional bit of the DCI, the instructions of the MAC-CE, or the RRC signal may indicate the transport block size calculation of the single transport block. In some aspects, the indication of the calculation of the transport block size may indicate the manner in which the transport block size may be calculated. For example, the indication of the calculation of the transport block size may indicate a formula to calculate the transport block size.

As illustrated at 512, the base station 504 may transmit the DCI to the UE 502. The UE 502 may receive the DCI from the base station 504. The DCI may schedule a PDSCH/PUSCH grant configuration based on the single transport block that spans more than one slot and has at least one gap between two adjacent PDSCH/PUSCH symbols.

As illustrated at 514, the UE 502 may determine a rate matching sequence of the single transport block. In some aspects, to determine the rate matching sequence of the single transport block, the UE 502 may refer to the indication (e.g., RRC, MAC-CE, DCI) of the calculation of the transport block size of the single transport block. For example, the transport block size may be capped to a predetermined size or may be based on the total number of granted symbols and the actual DMRS overhead. As such, the indication may indicate that the transport block size may be capped to the predetermined size or may be based on the total number of granted symbols and the actual DMRS overhead. The proper determination of the rate matching sequence may be dependent upon the transport block size. The UE 502 having an incorrect transport block size may result in an erroneous rate matching of the plurality of PDSCH/PUSCH symbols within the single transport block.

As illustrated at 516, the UE 502 may communicate with the base station based on a corresponding grant of the plurality of PDSCH/PUSCH symbols. The UE 502 may communicate with the base station 504 based on the schedule configured by the DCI. For example, the UE 502 may transmit a PUCCH based on the DCI or may receive a PDCCH based on the DCI.

Figure 6:
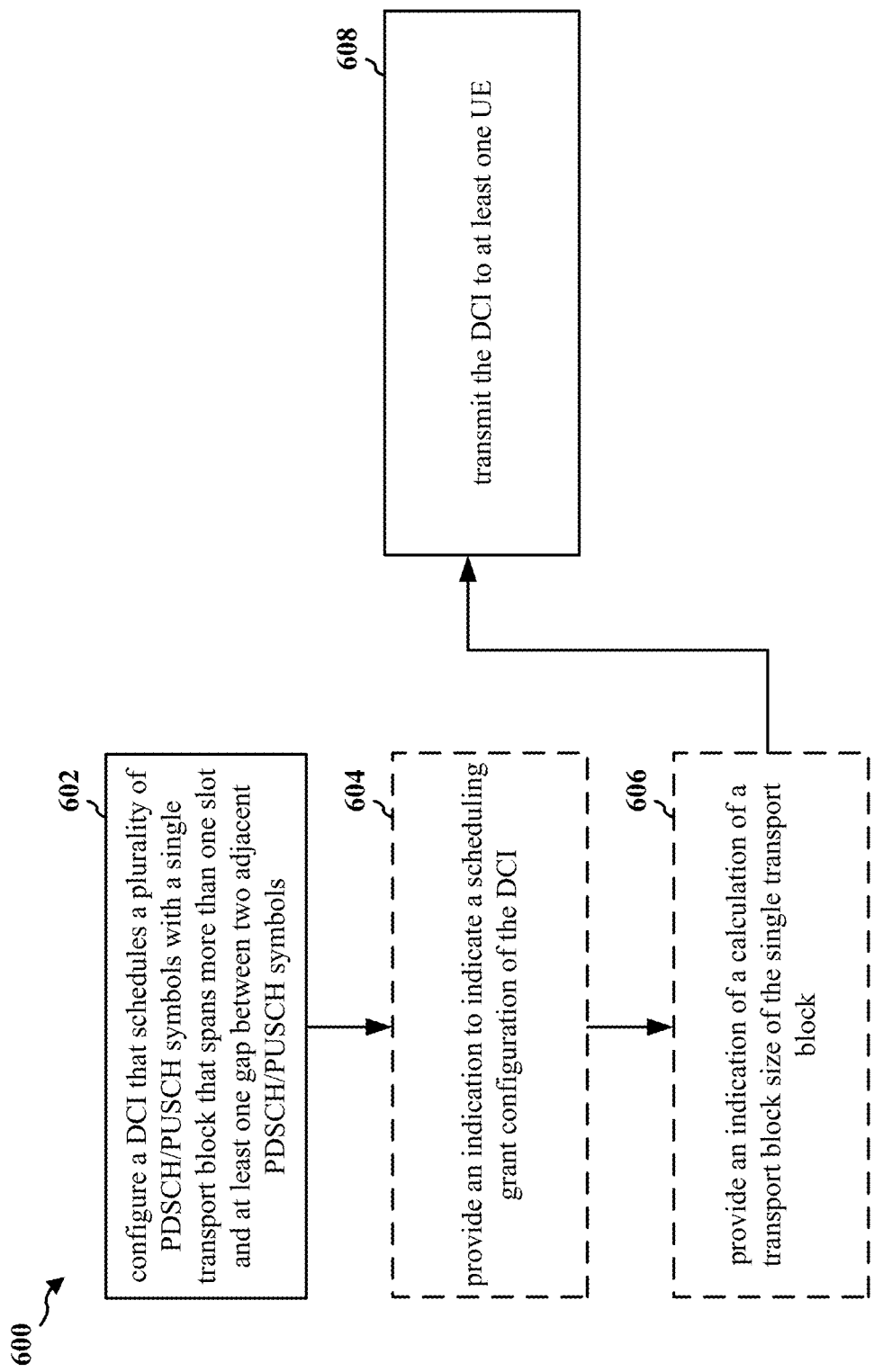
FIG. 6 is a flowchart of a method of wireless communication.

FIG. 6 is a flowchart 600 of a method of wireless communication. The method may be performed by a base station or a component of a base station (e.g., the base station 102/180; the apparatus 702; the baseband unit 704, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to configure a DCI having a single transport block that spans more than one slot and has a noncontiguous time domain allocation.

At 602, the base station configures DCI that schedules a plurality of PDSCH/PUSCH symbols with a single transport block that spans more than one slot. For example, 602 may be performed by configuration component 740 of apparatus 702. The single transport block may include a noncontiguous time domain allocation comprising at least one gap between two adjacent PDSCH/PUSCH symbols. Each of the plurality of PDSCH/PUSCH symbols may be contiguous and may have a respective SLIV. In some aspects, the at least one gap may comprise at least one symbol. The DCI may schedule the at least one gap within the single transport block that spans more than one slot. In some aspects, the at least one gap may be utilized for control monitoring or for uplink transmission. In some aspects, the at least one gap may be utilized for any other uplink and/or downlink communication between the UE and the base station. In some aspects, time domain resource allocations for the plurality of PDSCH/PUSCH symbols may comprise multiple SLIVs. For example, the multiple SLIVs may identify the start symbol and a length for different sets of contiguous PDSCH/PUSCH symbols, such that the multiple SLIVs correspond to a PDSCH/PUSCH. The at least one gap may be between two adjacent SLIVs. In some aspects, a calculation of a size of the single transport block may be based on a total number of granted symbols and a total DMRS overhead. In some aspects, a DMRS pattern may be the same for each of the plurality of PDSCH/PUSCH symbols. For example, the DMRS pattern for each set of contiguous PDSCH/PUSCH symbols may be the same as a single slot PDSCH/PUSCH having the same SLIV.

In some aspects, for example at 604, the base station may provide an indication to indicate a scheduling grant configuration of the DCI. For example, 604 may be performed by indication component 742 of apparatus 702. The base station may provide the indication of the scheduling grant configuration to at least one UE. In some aspects, the indication may be provided via RRC, MAC-CE, or DCI. In some aspects, the MAC-CE may provide instructions to interpret the scheduling grant configuration of the DCI. In some aspects, the DCI may include an additional bit, where the value of the additional bit may indicate a type of the scheduling grant configuration of the DCI. For example, the value of the additional bit of the DCI, the instructions of the MAC-CE, or the RRC signal may indicate that the type of scheduling grant configuration of the DCI comprises a single transport block spanning more than one slot and having gaps in between a plurality of PDSCH/PUSCH symbols.

In some aspects, for example at 606, the base station may provide an indication of a calculation of a transport block size of the single transport block. For example, 606 may be performed by indication component 742 of apparatus 702. The base station may provide the indication of the calculation of the transport block size of the single transport block to the at least one UE. In some aspects, the indication of the calculation of the transport block size may be provided via RRC, MAC-CE, or DCI. In some aspects, the indication of the calculation of the transport block size may indicate the manner in which the transport block size may be calculated. For example, the indication of the calculation of the transport block size may indicate a formula to calculate the transport block size.

At 608, the base station may transmit the DCI. For example, 608 may be performed by DCI component 744 of apparatus 702. The base station may transmit the DCI to the at least one UE. The DCI scheduling a PDSCH/PUSCH grant configuration based on the single transport block that spans more than one slot and has at least one gap between two adjacent PDSCH/PUSCH symbols.

Figure 7:
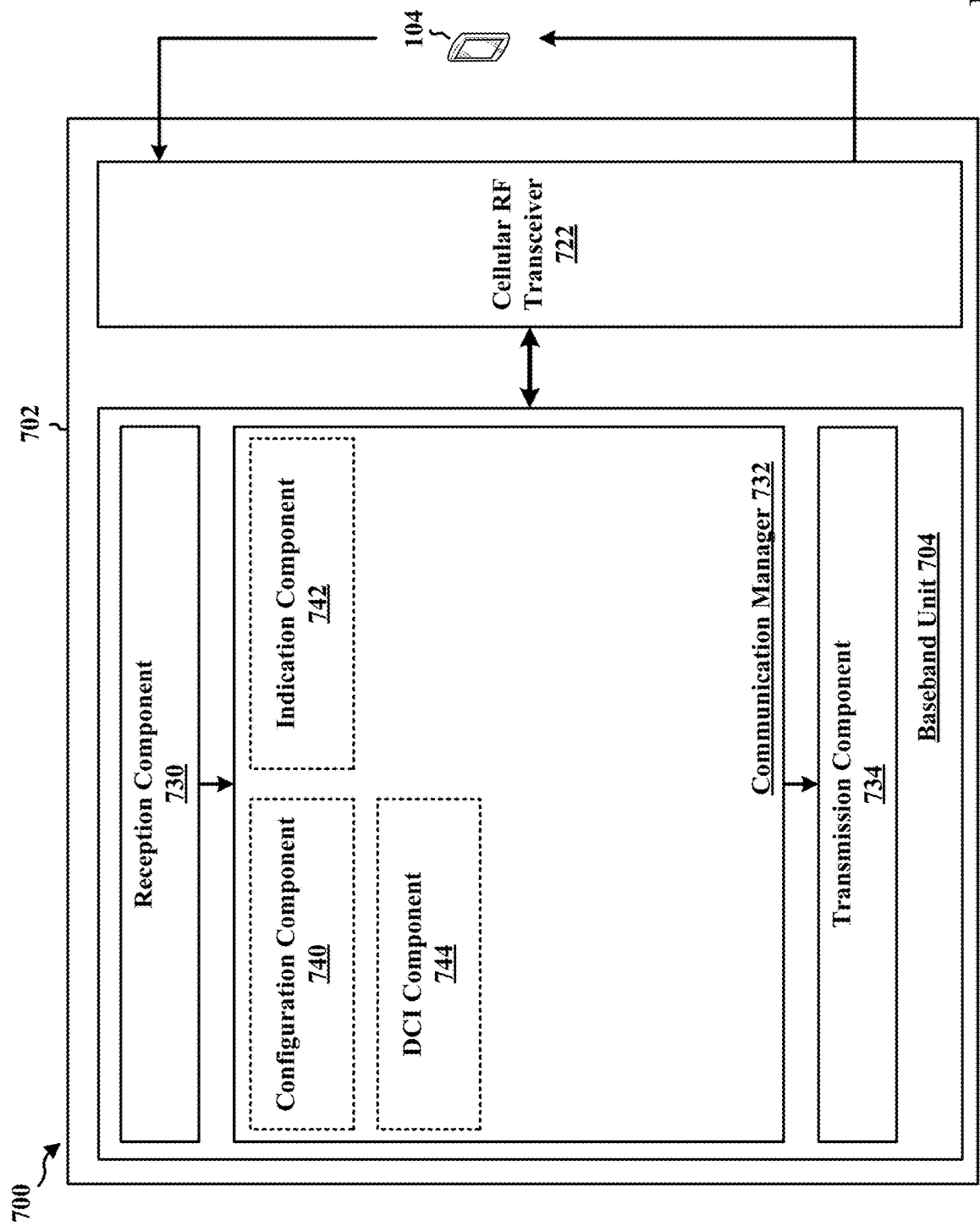
FIG. 7 is a diagram illustrating an example of a hardware implementation for an example apparatus.

FIG. 7 is a diagram 700 illustrating an example of a hardware implementation for an apparatus 702. The apparatus 702 is a BS and includes a baseband unit 704. The baseband unit 704 may communicate through a cellular RF transceiver 722 with the UE 104. The baseband unit 704 may include a computer-readable medium/memory. The baseband unit 704 is responsible for general processing, including the execution of software stored on the computer-readable medium/memory. The software, when executed by the baseband unit 704, causes the baseband unit 704 to perform the various functions described supra. The computer-readable medium/memory may also be used for storing data that is manipulated by the baseband unit 704 when executing software. The baseband unit 704 further includes a reception component 730, a communication manager 732, and a transmission component 734. The communication manager 732 includes the one or more illustrated components. The components within the communication manager 732 may be stored in the computer-readable medium/memory and/or configured as hardware within the baseband unit 704. The baseband unit 704 may be a component of the BS 310 and may include the memory 376 and/or at least one of the TX processor 316, the RX processor 370, and the controller/processor 375.

The communication manager 732 includes a configuration component 740 that configures DCI that schedules a plurality of PDSCH/PUSCH symbols with a single transport block that spans more than one slot, e.g., as described in connection with 602 of FIG. 6. The communication manager 732 further includes an indication component 742 that may provide an indication to indicate a scheduling grant configuration of the DCI, e.g., as described in connection with 604 of FIG. 6. The indication component 742 may be configured to provide an indication of a calculation of a transport block size of the single transport block, e.g., as described in connection with 606 of FIG. 6. The communication manager 732 further includes a DCI component 744 that may transmit the DCI, e.g., as described in connection with 608 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the baseband unit 704, includes means for configuring DCI that schedules a plurality of PDSCH symbols or PUSCH symbols with a single transport block that spans more than one slot and at least one gap between two adjacent PDSCH symbols or PUSCH symbols. Each of the plurality of PDSCH symbols or PUSCH symbols are contiguous and have a respective SLIV. The apparatus includes means for transmitting the DCI to at least one UE. The apparatus further includes means for providing an indication to indicate a scheduling grant configuration of the DCI. The apparatus further includes means for providing an indication of a calculation of a transport block size of the single transport block. The aforementioned means may be one or more of the aforementioned components of the apparatus 702 configured to perform the functions recited by the aforementioned means. As described supra, the apparatus 702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 8:
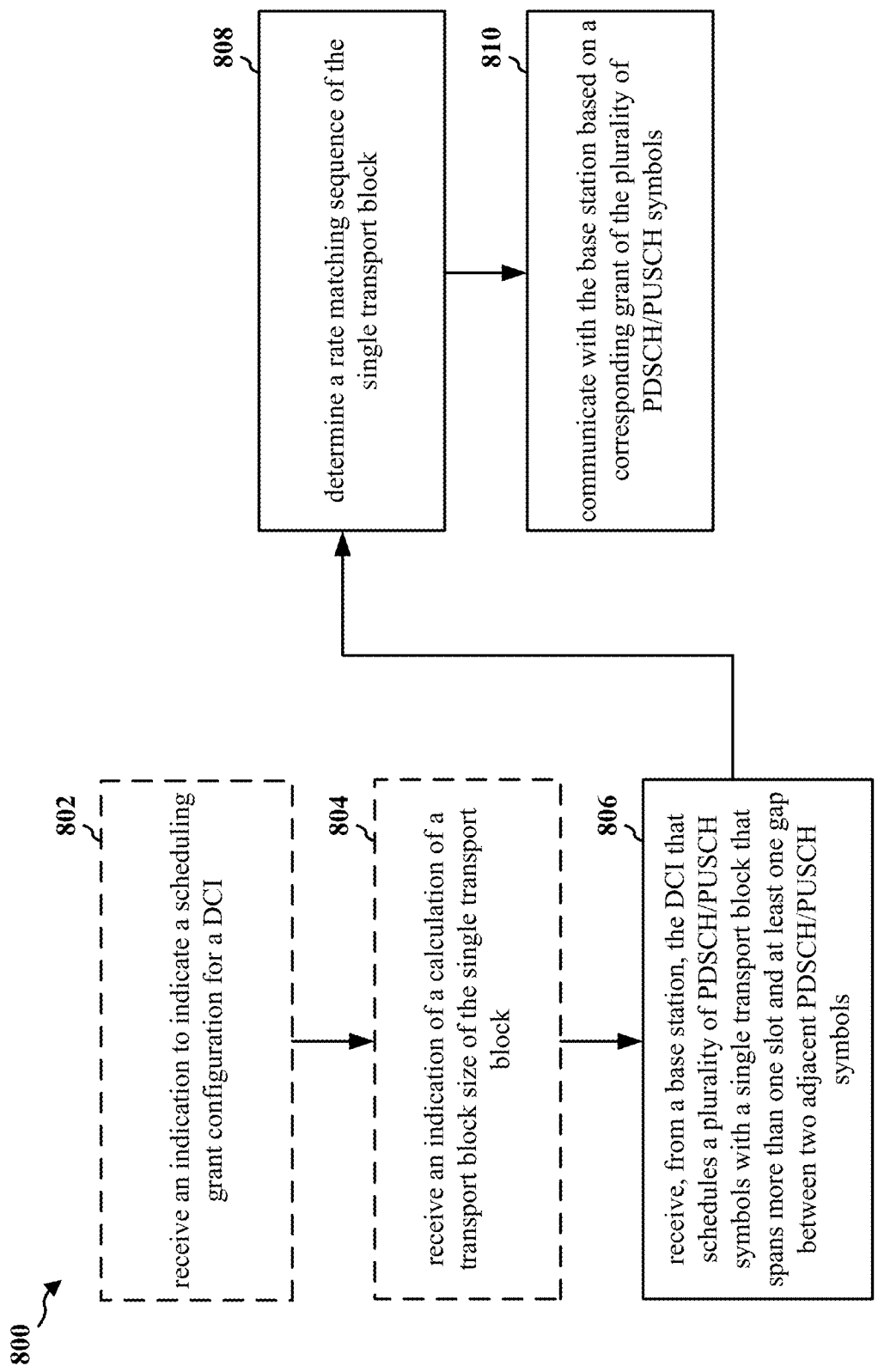
FIG. 8 is a flowchart of a method of wireless communication.

FIG. 8 is a flowchart 800 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may configure a UE to receive a DCI having a single transport block that spans more than one slot and has a noncontiguous time domain allocation.

In some aspects, for example at 802, the UE may receive an indication to indicate a scheduling grant configuration of a DCI. For example, 802 may be performed by indication component 940 of apparatus 902. The UE may receive the indication to indicate the scheduling grant configuration of the DCI from a base station. In some aspects, the indication may be provided via RRC, MAC-CE, or DCI. In some aspects, the MAC-CE may provide instructions to interpret the scheduling grant configuration of the DCI. In some aspects, the DCI may include an additional bit, where the value of the additional bit may indicate a type of the scheduling grant configuration of the DCI. For example, the value of the additional bit of the DCI or the instructions of the MAC-CE may indicate that the type of scheduling grant configuration of the DCI comprises a single transport block spanning more than one slot and having gaps in between a plurality of PDSCH/PUSCH symbols.

In some aspects, for example at 804, the UE may receive an indication of a calculation of a transport block size of the single transport block. For example, 804 may be performed by indication component 940 of apparatus 902. The UE may receive the indication of the calculation of the transport block size from the base station. In some aspects, the indication of the calculation of the transport block size may be provided via RRC, MAC-CE, or DCI. In some aspects, the indication of the calculation of the transport block size may indicate the manner in which the transport block size may be calculated. For example, the indication of the calculation of the transport block size may indicate a formula to calculate the transport block size.

At 806, the UE may receive the DCI that schedules a plurality of PDSCH/PUSCH symbols with a single transport block that spans more than one slot. For example, 806 may be performed by schedule component 942 of apparatus 902. The single transport block may include at least one gap between two adjacent PDSCH/PUSCH symbols. Each of the plurality of PDSCH/PUSCH symbols may be contiguous and may have a respective SLIV. In some aspects, the at least one gap may comprise at least one symbol. The DCI may schedule the at least one gap within the single transport block that spans more than one slot. In some aspects, the at least one gap may be utilized for control monitoring or for uplink transmission. In some aspects, the at least one gap may be utilized for any other uplink and/or downlink communication between the UE and the base station. In some aspects, time domain resource allocations for the plurality of PDSCH/PUSCH symbols may comprise multiple SLIVs. For example, the multiple SLIVs may identify the start symbol and a length for different sets of contiguous PDSCH/PUSCH symbols, such that the multiple SLIVs correspond to a PDSCH/PUSCH. The at least one gap may be between two adjacent SLIVs. In some aspects, a calculation of a size of the single transport block may be based on a total number of granted symbols and a total DMRS overhead. In some aspects, a DMRS pattern may be the same for each of the plurality of PDSCH/PUSCH symbols. For example, the DMRS pattern for each set of contiguous PDSCH/PUSCH symbols may be the same as a single slot PDSCH/PUSCH having the same SLIV.

At 808, the UE may determine a rate matching sequence of the single transport block. For example, 808 may be performed by rate matching component 944 of apparatus 902. In some aspects, to determine the rate matching sequence of the single transport block, the UE may refer to the indication of the calculation of the transport block size of the single transport block. For example, the transport block size may be capped to a predetermined size or may be based on the total number of granted symbols and the actual DMRS overhead. As such, the indication may indicate that the transport block size may be capped to the predetermined size or may be based on the total number of granted symbols and the actual DMRS overhead. The proper determination of the rate matching sequence may be dependent upon the transport block size. The UE having an incorrect transport block size may result in an erroneous rate matching of the plurality of PDSCH/PUSCH symbols within the single transport block.

At 810, the UE may communicate with the base station based on a corresponding grant of the plurality of PDSCH/PUSCH symbols. For example, 810 may be performed by grant component 946 of apparatus 902. The UE may communicate with the base station based on a schedule configured by the DCI.

Figure 9:
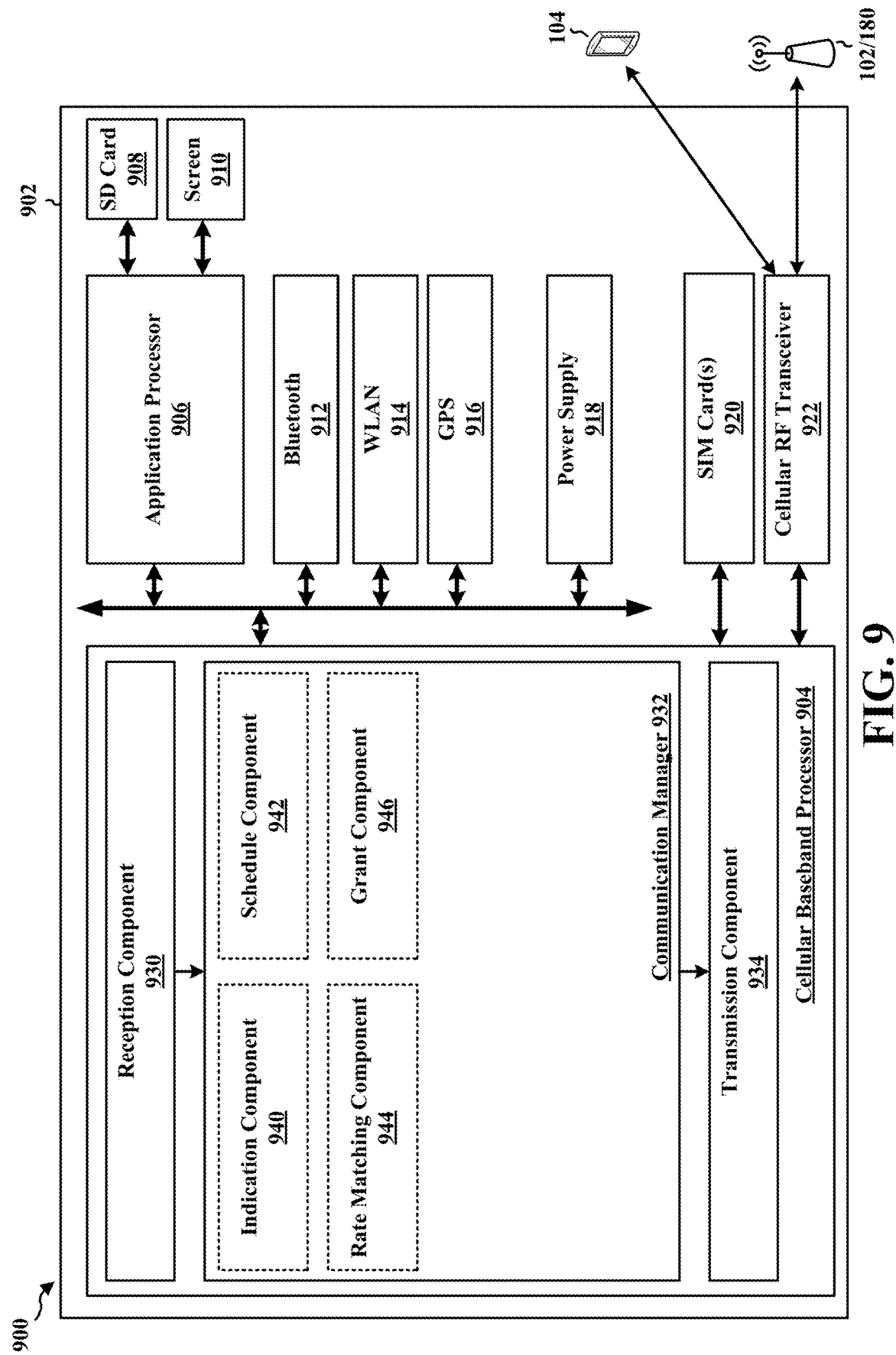
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the aforediscussed additional modules of the apparatus 902.

The communication manager 932 includes an indication component 940 that is configured to receive an indication to indicate a scheduling grant configuration of a DCI, e.g., as described in connection with 802 of FIG. 8. The indication component 940 may be configured to receive an indication of a calculation of a transport block size of the single transport block, e.g., as described in connection with 804 of FIG. 8. The communication manager 932 further includes a schedule component 942 that is configured to receive the DCI that schedules a plurality of PDSCH/PUSCH symbols with a single transport block that spans more than one slot, e.g., as described in connection with 806 of FIG. 8. The communication manager 932 further includes a rate matching component 944 that is configured to determine a rate matching sequence of the single transport block, e.g., as described in connection with 808 of FIG. 8. The communication manager 932 further includes a grant component 946 that is configured to communicate with the base station based on a corresponding grant of the plurality of PDSCH/PUSCH symbols, e.g., as described in connection with 810 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, DCI that schedules a plurality of PDSCH symbols or PUSCH symbols with a single transport block that spans more than one slot and at least one gap between two adjacent PDSCH symbols or PUSCH symbols. Each of the plurality of PDSCH symbols or PUSCH symbols are contiguous and have a respective SLIV. The apparatus includes means for determining a rate matching sequence of the single transport block. The apparatus includes means for communicating with the base station based on a corresponding grant of the plurality of PDSCH symbols or PUSCH symbols, wherein communication with the base station is based on a schedule configured by the DCI. The apparatus further includes means for receiving an indication to indicate a scheduling grant configuration of the DCI. The apparatus further includes means for receiving an indication of a calculation of a transport block size of the single transport block. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a base station comprising configuring DCI that schedules a plurality of PDSCH symbols or a plurality of PUSCH symbols with a single transport block that spans more than one slot and at least one gap between two adjacent PDSCH symbols or PUSCH symbols, wherein each of the plurality of PDSCH symbols or PUSCH symbols are contiguous and have a respective SLIV; and transmitting the DCI to at least one UE.

In Aspect 2, the method of Aspect 1 further includes that the at least one gap comprises at least one symbol.

In Aspect 3, the method of Aspect 1 or 2 further includes that time domain resource allocations for the plurality of PDSCH symbols or PUSCH symbols comprise multiple SLIVs, wherein at least one gap is between two adjacent SLIVs.

In Aspect 4, the method of any of Aspects 1-3 further includes that a calculation of a size of the single transport block is based on a total number of granted symbols and a total DMRS overhead.

In Aspect 5, the method of any of Aspects 1-4 further includes that a DMRS pattern is the same for each of the plurality of PDSCH symbols or PUSCH symbols.

In Aspect 6, the method of any of Aspects 1-5 further includes providing an indication to indicate a scheduling grant configuration of the DCI.

In Aspect 7, the method of any of Aspects 1-6 further includes that the indication is provided via RRC signaling, MAC-CE, or DCI.

In Aspect 8, the method of any of Aspects 1-7 further includes that the MAC-CE provides instructions to interpret the scheduling grant configuration of the DCI.

In Aspect 9, the method of any of Aspects 1-8 further includes that the DCI includes an additional bit, wherein a value of the additional bit indicates a type of the scheduling grant configuration of the DCI.

In Aspect 10, the method of any of Aspects 1-9 further includes providing an indication of a calculation of a transport block size of the single transport block.

In Aspect 11, the method of any of Aspects 1-10 further includes that the indication of the calculation of the transport block size is provided via RRC signaling, MAC-CE, or DCI.

Aspect 12 is a device including one or more processors and one or more memories in electronic communication with the one or more processors and storing instructions executable by the one or more processors to cause the device to implement a method as in any of Aspects 1-11.

Aspect 13 is a system or apparatus including means for implementing a method or realizing an apparatus as in any of Aspects 1-11.

Aspect 14 is a non-transitory computer readable storage medium storing instructions executable by one or more processors to cause the one or more processors to implement a method as in any of Aspect 1-11.

Aspect 15 is a method of wireless communication at a UE comprising receiving, from a base station, DCI that schedules a plurality of PDSCH symbols or a plurality of PUSCH symbols with a single transport block that spans more than one slot and at least one gap between two adjacent PDSCH symbols or PUSCH symbols, wherein each of the plurality of PDSCH symbols or PUSCH symbols are contiguous and have a respective SLIV; determining a rate matching sequence of the single transport block; and communicating with the base station based on a corresponding grant of the plurality of PDSCH symbols or PUSCH symbols, wherein communication with the base station is based on a schedule configured by the DCI.

In Aspect 16, the method of Aspect 15 further includes that the at least one gap comprises at least one symbol.

In Aspect 17, the method of Aspect 15 or 16 further includes that time domain resource allocations for the plurality of PDSCH symbols or PUSCH symbols comprise multiple SLIVs, wherein at least one gap is between two adjacent SLIVs.

In Aspect 18, the method of any of Aspects 15-17 further includes that a calculation of a size of the single transport block is based on a total number of granted symbols and a total DMRS overhead.

In Aspect 19, the method of any of Aspects 15-18 further includes that a DMRS pattern is the same for each of the plurality of PDSCH symbols or PUSCH symbols.

In Aspect 20, the method of any of Aspects 15-19 further includes receiving an indication to indicate a scheduling grant configuration of the DCI.

In Aspect 21, the method of any of Aspects 15-20 further includes that the indication is received via RRC signaling, MAC-CE, or DCI.

In Aspect 22, the method of any of Aspects 15-21 further includes that the MAC-CE provides instructions to interpret the scheduling grant configuration of the DCI.

In Aspect 23, the method of any of Aspects 15-22 further includes that the DCI includes an additional bit, wherein a value of the additional bit indicates a type of the scheduling grant configuration of the DCI.

In Aspect 24, the method of any of Aspects 15-23 further includes that the determining the rate matching sequence of the single transport block further includes receiving an indication of a calculation of a transport block size of the single transport block.

In Aspect 25, the method of any of Aspects 15-24 further includes that the indication of the calculation of the transport block size is provided via RRC signaling, MAC-CE, or DCI.

Aspect 26 is a device including one or more processors and one or more memories in electronic communication with the one or more processors and storing instructions executable by the one or more processors to cause the device to implement a method as in any of Aspects 15-25.

Aspect 27 is a system or apparatus including means for implementing a method or realizing an apparatus as in any of Aspects 15-25.

Aspect 28 is a non-transitory computer readable storage medium storing instructions executable by one or more processors to cause the one or more processors to implement a method as in any of Aspect 15-25.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    configuring downlink control information (DCI) that schedules a plurality of physical downlink shared channel (PDSCH) symbols or a plurality of physical uplink shared channel (PUSCH) symbols with a single transport block that spans more than one slot and at least one gap between two adjacent PDSCH symbols or PUSCH symbols, wherein each of the plurality of PDSCH symbols or PUSCH symbols are contiguous and have a respective start and length indicator value (SLIV); and
    transmitting the DCI to at least one user equipment (UE).

2. The method of claim 1, wherein the at least one gap comprises at least one symbol.

3. The method of claim 1, wherein time domain resource allocations for the plurality of PDSCH symbols or PUSCH symbols comprise multiple SLIVs, wherein at least one gap is between two adjacent SLIVs.

4. The method of claim 1, wherein a calculation of a size of the single transport block is based on a total number of granted symbols and a total demodulation reference signal (DMRS) overhead.

5. The method of claim 1, wherein a demodulation reference signal (DMRS) pattern is the same for each of the plurality of PDSCH symbols or PUSCH symbols.

6. The method of claim 1, further comprising:
providing an indication to indicate a scheduling grant configuration of the DCI.

7. The method of claim 6, wherein the indication is provided via radio resource control (RRC) signaling, medium access control (MAC) control element (CE) (MAC-CE), or DCI.

8. The method of claim 7, wherein the MAC-CE provides instructions to interpret the scheduling grant configuration of the DCI.

9. The method of claim 7, wherein the DCI includes an additional bit, wherein a value of the additional bit indicates a type of the scheduling grant configuration of the DCI.

10. The method of claim 1, further comprising:
providing an indication of a calculation of a transport block size of the single transport block.

11. The method of claim 10, wherein the indication of the calculation of the transport block size is provided via radio resource control (RRC) signaling, medium access control (MAC) control element (CE) (MAC-CE), or DCI.

12. An apparatus for wireless communication at a user equipment (UE), comprising:
a memory; and
at least one processor coupled to the memory and configured to:
configure downlink control information (DCI) that schedules a plurality of physical downlink shared channel (PDSCH) symbols or a plurality of physical uplink shared channel (PUSCH) symbols with a single transport block that spans more than one slot and at least one gap between two adjacent PDSCH symbols or PUSCH symbols, wherein each of the plurality of PDSCH symbols or PUSCH symbols are contiguous and have a respective start and length indicator value (SLIV); and
transmit the DCI to at least one user equipment (UE).

13. The apparatus of claim 12, wherein the at least one gap comprises at least one symbol.

14. The apparatus of claim 12, wherein the at least one processor further configured to:
provide an indication to indicate a scheduling grant configuration of the DCI.

15. The apparatus of claim 12, wherein the at least one processor further configured to:
provide an indication of a calculation of a transport block size of the single transport block.

16. A method of wireless communication at a user equipment (UE), comprising:
receiving, from a base station, downlink control information (DCI) that schedules a plurality of physical downlink shared channel (PDSCH) symbols or a plurality of physical uplink shared channel (PUSCH) symbols with a single transport block that spans more than one slot and at least one gap between two adjacent PDSCH symbols or PUSCH symbols, wherein each of the plurality of PDSCH symbols or PUSCH symbols are contiguous and have a respective start and length indicator value (SLIV);
determining a rate matching sequence of the single transport block; and
communicating with the base station based on a corresponding grant of the plurality of PDSCH symbols or PUSCH symbols, wherein communication with the base station is based on a schedule configured by the DCI.

17. The method of claim 16, wherein the at least one gap comprises at least one symbol.

18. The method of claim 16, wherein time domain resource allocations for the plurality of PDSCH symbols or PUSCH symbols comprise multiple SLIVs, wherein at least one gap is between two adjacent SLIVs.

19. The method of claim 16, wherein a calculation of a size of the single transport block is based on a total number of granted symbols and a total demodulation reference signal (DMRS) overhead.

20. The method of claim 16, wherein a demodulation reference signal (DMRS) pattern is the same for each of the plurality of PDSCH symbols or PUSCH symbols.

21. The method of claim 16, further comprising:
receiving an indication to indicate a scheduling grant configuration of the DCI.

22. The method of claim 21, wherein the indication is received via radio resource control (RRC) signaling, medium access control (MAC) control element (CE) (MAC-CE), or DCI.

23. The method of claim 22, wherein the MAC-CE provides instructions to interpret the scheduling grant configuration of the DCI.

24. The method of claim 22, wherein the DCI includes an additional bit, wherein a value of the additional bit indicates a type of the scheduling grant configuration of the DCI.

25. The method of claim 16, wherein the determining the rate matching sequence of the single transport block further comprising:
receiving an indication of a calculation of a transport block size of the single transport block.

26. The method of claim 25, wherein the indication of the calculation of the transport block size is provided via radio resource control (RRC) signaling, medium access control (MAC) control element (CE) (MAC-CE), or DCI.

27. An apparatus for wireless communication at a base station, comprising:
a memory; and
at least one processor coupled to the memory and configured to:
receive, from a base station, downlink control information (DCI) that schedules a plurality of physical downlink shared channel (PDSCH) symbols or a plurality of physical uplink shared channel (PUSCH) symbols with a single transport block that spans more than one slot and at least one gap between two adjacent PDSCH symbols or PUSCH symbols, wherein each of the plurality of PDSCH symbols or PUSCH symbols are contiguous and have a respective start and length indicator value (SLIV);
determine a rate matching sequence of the single transport block; and
communicating with the base station based on a corresponding grant of the plurality of PDSCH symbols or PUSCH symbols, wherein communication with the base station is based on a schedule configured by the DCI.

28. The apparatus of claim 27, wherein the at least one gap comprises at least one symbol.

29. The apparatus of claim 27, wherein the at least one processor further configured to:

receive an indication to indicate a scheduling grant configuration of the DCI.

30. The apparatus of claim 27, wherein to determine the rate matching sequence of the single transport block the at least one processor further configured to:
receive an indication of a calculation of a transport block size of the single transport block.

* * * * *